US012669384B2

(12) United States Patent
Choi et al.

(10) Patent No.: US 12,669,384 B2
(45) Date of Patent: Jun. 30, 2026

(54) TEMPERATURE SENSOR CAPABLE OF DETERMINING WHETHER TO CONVERT REFERENCE VOLTAGE TO VOLTAGE DIGITAL CODE BASED ON CONDITION, AND DEVICES HAVING THE SAME

(71) Applicant: SAMSUNG ELECTRONICS CO., LTD., Suwon-si (KR)

(72) Inventors: Haejung Choi, Daegu (KR); Kwangho Kim, Yongin-si (KR); Junhee Shin, Yongin-si (KR); Cheolhwan Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 809 days.

(21) Appl. No.: 17/994,155

(22) Filed: Nov. 25, 2022

(65) Prior Publication Data

US 2023/0273073 A1     Aug. 31, 2023

(30) Foreign Application Priority Data

Feb. 25, 2022     (KR) ........................ 10-2022-0025317

(51) Int. Cl.
*G01K 7/01*          (2006.01)
(52) U.S. Cl.
CPC ........... *G01K 7/01* (2013.01); *G01K 2219/00* (2013.01)
(58) Field of Classification Search
None
See application file for complete search history.

(56) References Cited

U.S. PATENT DOCUMENTS

| | | | |
|---|---|---|---|
| 5,803,357 A * | 9/1998 | Lakin | ................. G05D 23/1932 |
| | | | 374/E1.005 |
| 7,581,882 B2 | 9/2009 | Noguchi | |
| 7,674,035 B2 | 3/2010 | Pertijs et al. | |
| 8,475,039 B2 | 7/2013 | Chern et al. | |
| 9,389,126 B2 | 7/2016 | Kim et al. | |
| 9,880,060 B2 | 1/2018 | Cho et al. | |
| 10,001,416 B2 | 6/2018 | Cho et al. | |
| 10,024,729 B2 | 7/2018 | Singh | |
| 10,218,370 B1 * | 2/2019 | Ma | ...................... H03M 1/0604 |
| 10,260,957 B2 | 4/2019 | Ma et al. | |
| 10,302,504 B1 * | 5/2019 | Parameswaran | ......... G01K 7/01 |

(Continued)

*Primary Examiner* — Michael J Dalbo
*Assistant Examiner* — Denise R Karavias
(74) *Attorney, Agent, or Firm* — Fish & Richardson P.C.

(57)          ABSTRACT

A temperature sensor includes a first selection circuit outputting one among temperature signals in response to a selection code. A reference voltage generator generates a reference voltage. A control circuit generates a control signal. A second selection circuit outputs the reference voltage and the temperature signal in response to the control signal indicating a voltage conversion condition is satisfied and outputs only the temperature signal in response to the control signal indicating the voltage conversion condition is not satisfied. A converter converts the reference voltage to a voltage digital code and the temperature signal to a temperature digital code in response to the control signal indicating the voltage conversion condition is satisfied and converts only the temperature signal to the temperature digital code in response to the control signal indicating the voltage conversion condition is not satisfied.

20 Claims, 8 Drawing Sheets

(56) References Cited

U.S. PATENT DOCUMENTS

| | | | |
|---|---|---|---|
| 2006/0120139 A1* | 6/2006 | Perner | G11C 7/20 |
| | | | 365/149 |
| 2008/0091378 A1* | 4/2008 | Jeong | G01K 7/01 |
| | | | 324/71.5 |
| 2013/0169347 A1* | 7/2013 | Kim | G06F 1/206 |
| | | | 327/513 |
| 2017/0257113 A1* | 9/2017 | Singh | G01K 7/01 |
| 2022/0316957 A1* | 10/2022 | Park | G01K 7/16 |

* cited by examiner

FIG. 3

| CTL1 | CTL2 | MO2 | Output of 230 | MO3 | OUTi |
|------|------|-----|---------------|-----|------|
| H | H | VREF -> MO1/ MO1 -> VREF | VCODEj & TCODEi | VCODEj | f(TCODEi,VCODEj) |
| L | H | MO1 Only | TCODEi Only | PVCODE | f(TCODEi,PVCODE) |

TEMPERATURE SENSOR CAPABLE OF DETERMINING WHETHER TO CONVERT REFERENCE VOLTAGE TO VOLTAGE DIGITAL CODE BASED ON CONDITION, AND DEVICES HAVING THE SAME

CROSS-REFERENCE TO RELATED APPLICATIONS

This application claims priority under 35 U.S.C. § 119 to Korean Patent Application No. 10-2022-0025317 filed on Feb. 25, 2022, in the Korean Intellectual Property Office, the disclosure of which is incorporated by reference herein in its entirety.

BACKGROUND

Embodiments of the present disclosure relate to a temperature sensor and, more particularly, relate to a temperature sensor capable of determining whether to convert a reference voltage into a voltage digital code using one time-to-digital converter based on a voltage conversion condition and devices including the same.

All electronic devices and circuits generate excessive heat during operation, so thermal management is necessary to improve reliability and prevent failures. The amount of heat output is equal to the input power, assuming no other energy interactions.

A temperature sensor is a sensor that detects heat (or temperature) generated by an object (e.g., electronic devices and circuits) and converts the detection result into an electrical signal. For example, a temperature sensor is a sensor in which an internal resistance value, voltage, or current changes depending on a change in the temperature of an object. The electrical resistance in a conductor changes depending on a change in temperature.

The temperature sensor may be used to monitor the temperature of an electronic device such as a central processing unit (CPU), a graphics processing unit (GPU), a micro controller unit (MCU), or a system on chip (SoC).

SUMMARY

Embodiments of the present disclosure provide a temperature sensor capable of: (1) converting a reference voltage and a temperature signal into a voltage digital code and a temperature digital code, respectively, only when a voltage conversion condition is satisfied and (2) converting only the temperature signal into the temperature digital code in other cases while including one time-to-digital converter, to reduce a conversion time of the one time-to-digital converter, and devices including the same.

According to an embodiment of the present disclosure, a temperature sensor includes a first selection circuit that outputs any one of temperature signals in response to a selection code. A reference voltage generator generates a reference voltage. A control circuit generates a control signal. A second selection circuit outputs the reference voltage and the one temperature signal in response to the control signal indicating that a voltage conversion condition is satisfied and outputs only the one temperature signal in response to the control signal indicating that the voltage conversion condition is not satisfied. A converter converts the reference voltage to a voltage digital code and converts the one temperature signal to a temperature digital code in response to the control signal indicating that the voltage conversion condition is satisfied and converts only the one temperature signal to the temperature digital code in response to the control signal indicating that the voltage conversion condition is not satisfied.

According to an embodiment of the present disclosure, a system on chip includes local temperature sensors that generate local temperature signals and a temperature sensor connected to the local temperature sensors. The temperature sensor includes: (1) a main temperature sensor that generates a main temperature signal, (2) a first selection circuit that outputs one of the local temperature signals and the main temperature signal in response to a selection code, (3) a reference voltage generator that generates a reference voltage, (4) a control circuit that generates a control signal, (5) a second selection circuit that outputs the reference voltage and the one temperature signal in response to the control signal indicating that a voltage conversion condition is satisfied and outputs only the one temperature signal in response to the control signal indicating that the voltage conversion condition is not satisfied, and (6) a converter that: (a) converts the reference voltage to a voltage digital code and converts the one temperature signal to a temperature digital code in response to the control signal indicating that the voltage conversion condition is satisfied and (b) converts only the one temperature signal to the temperature digital code in response to the control signal indicating that the voltage conversion condition is not satisfied.

According to an embodiment of the present disclosure, an electronic device includes a system on chip and a device connected to the system on chip. The system on chip includes local temperature sensors that generate local temperature signals and a temperature sensor connected to the local temperature sensors. The temperature sensor includes: (1) a main temperature sensor that generates a main temperature signal, (2) first selection circuit that outputs one of the local temperature signals and the main temperature signal in response to a selection code, (3) a reference voltage generator that generates a reference voltage, (4) a control circuit that generates a control signal, (5) a second selection circuit that outputs the reference voltage and the one temperature signal in response to the control signal indicating that a voltage conversion condition is satisfied and outputs only the one temperature signal in response to the control signal indicating that the voltage conversion condition is not satisfied, and (6) a converter that converts: (a) the reference voltage to a voltage digital code and converts the one temperature signal to a temperature digital code in response to the control signal indicating that the voltage conversion condition is satisfied and (b) converts only the one temperature signal to the temperature digital code in response to the control signal indicating that the voltage conversion condition is not satisfied.

BRIEF DESCRIPTION OF THE FIGURES

A detailed description of each drawing is provided to facilitate a more thorough understanding of the drawings referenced in the detailed description of the present disclosure.

FIG. 3 is a table for describing an operation of a temperature sensor illustrated in FIGS. 2 and 5.

DETAILED DESCRIPTION

Figure 1:
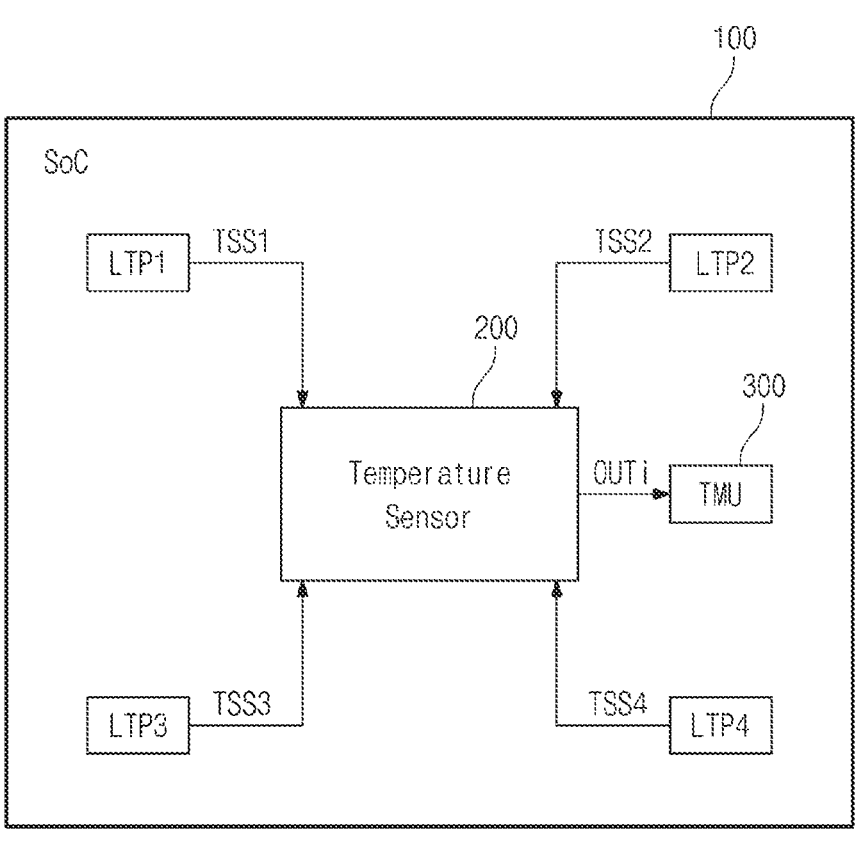
FIG. 1 is a block diagram of a system on chip including a temperature sensor capable of determining whether to change a reference voltage to a voltage digital code, according to an embodiment of the present disclosure.

FIG. 1 is a block diagram of a system on chip including a temperature sensor capable of determining whether to change a reference voltage to a voltage digital code, according to an embodiment of the present disclosure.

Referring to FIG. 1, an integrated circuit (IC) 100 or a system on chip (SoC) 100 includes a plurality of local (or remote) temperature probes LTP1 to LTP4, a temperature sensor 200, and a thermal management unit (TMU) 300.

In the present specification, each of temperature probes LTP1, LTP2, LTP3, LTP4 may be a temperature detector detecting the temperature of an object or a temperature sensor detecting the temperature.

An operation of the temperature sensor 200 that may determine whether to convert a reference voltage VREF into a digital code representing a voltage (hereinafter referred to as a 'voltage digital code') according to a voltage conversion condition will be described in detail with reference to FIGS. 2 to 8.

The thermal management unit 300 refers to hardware or software capable of adjusting the temperature of an object in response to a temperature code OUTi ('i' is a natural number, and hereinafter also referred to as 'temperature information') output from the temperature sensor 200.

According to embodiments, the thermal management unit 300 may be included in a central processing unit (CPU), a graphics processor unit (GPU), or a processor or may be disposed outside the CPU, the GPU, or the processor and may perform an operation for controlling the power and/or operating speed of the CPU, the GPU, or the processor. In this case, the operation may be dynamic voltage and frequency scaling, but is not limited thereto.

Figure 2:
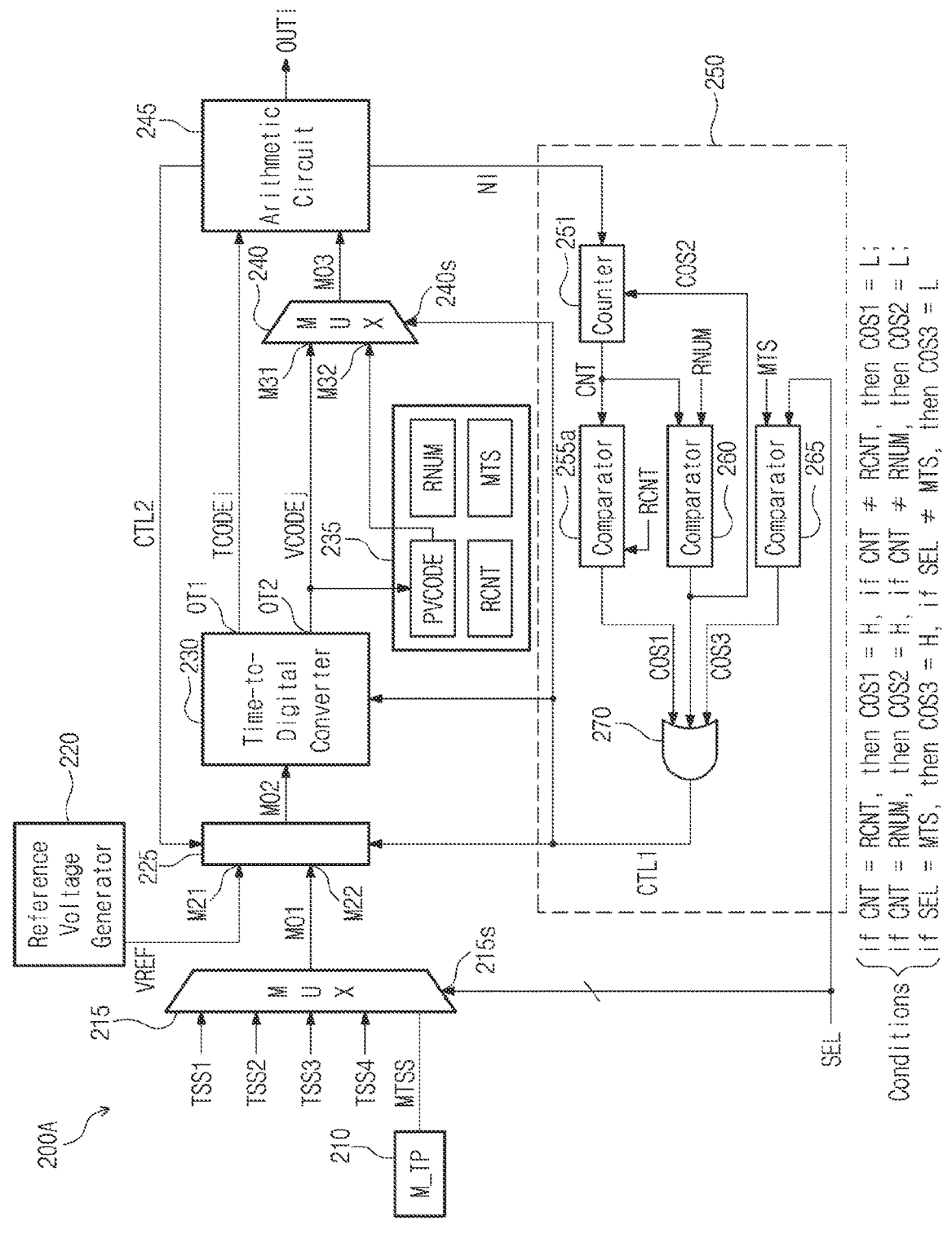
FIG. 2 is a block diagram of any one of embodiments of a temperature sensor illustrated in FIG. 1.
Figure 5:
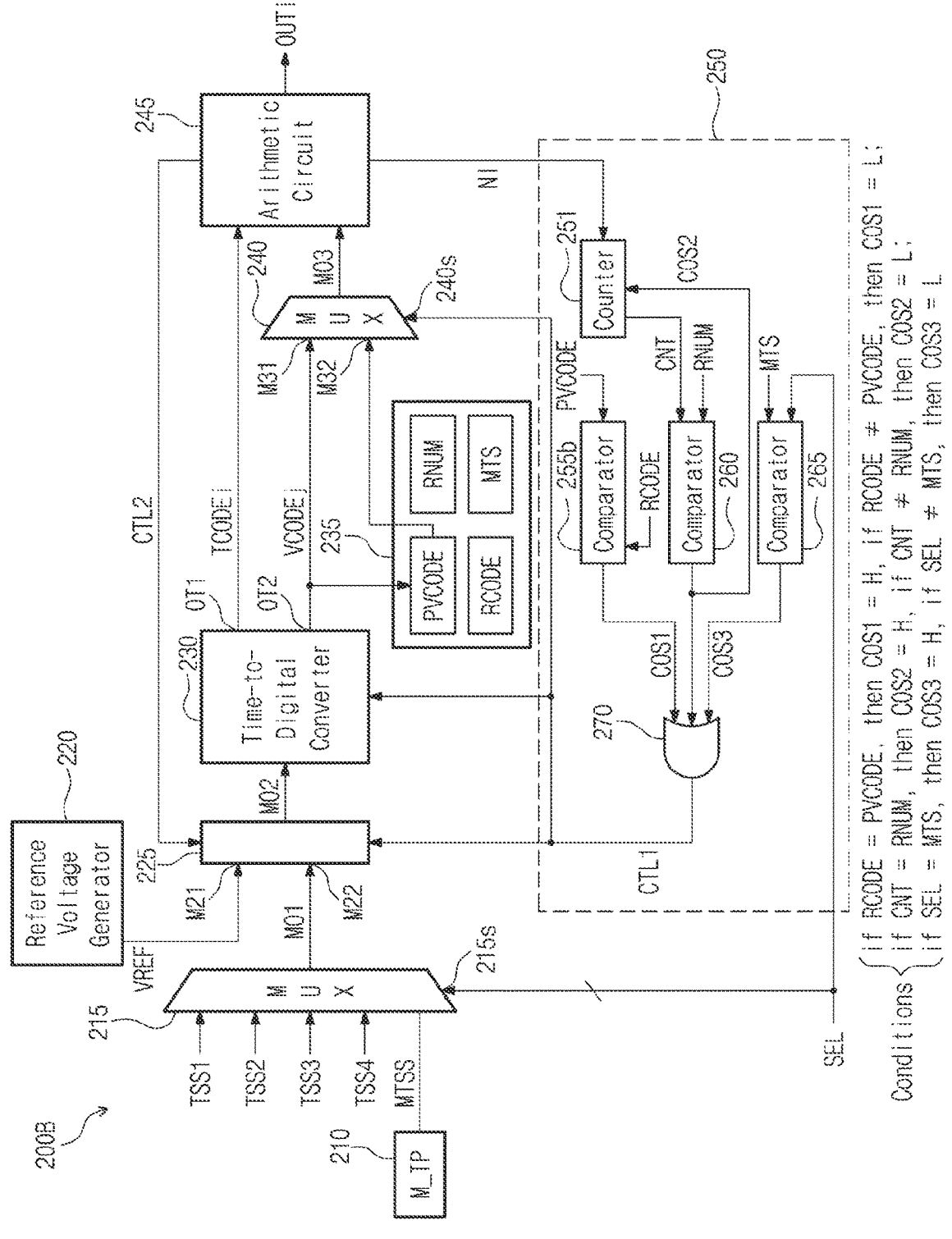
FIG. 5 is a block diagram of another embodiment of a temperature sensor illustrated in FIG. 1.

FIG. 2 is a block diagram of any one of embodiments of a temperature sensor illustrated in FIG. 1, and FIG. 3 is a table for describing the operation of a temperature sensor illustrated in FIGS. 2 and 5.

Referring to FIG. 2, a temperature sensor 200A corresponding to an embodiment of the temperature sensor 200 of FIG. 1 includes a main temperature probe 210, a first selection circuit 215, a reference voltage generator 220, a second selection circuit 225, a converter 230, a memory device 235, a third selection circuit 240, an arithmetic circuit 245, and a control circuit 250.

Each of the local temperature probes LTP1, LTP2, LTP3, and LTP4 disposed outside of the temperature sensor 200A senses the temperature of each object and generates local temperature signals TSS1, TSS2, TSS3 and TSS4, respectively. The main temperature probe 210 disposed inside the temperature sensor 200A senses the temperature of an object and generates a main temperature signal MTSS.

For example, each of the temperature signals TSS1, TSS2, TSS3, TSS4, and MTSS may be a signal (e.g., voltage) that changes depending on a change in temperature and may be a signal having a characteristic of PTAT (proportional to absolute temperature), but is not limited thereto.

The first selection circuit 215 outputs any one of the temperature signals TSS1, TSS2, TSS3, TSS4, and MTSS to the selection circuit 225 in response to a selection code SEL input to a selection terminal 215s. In this specification, a code may mean a set of digital signals, a value of each of the digital signals may have a logic '1' or a logic '0', and the logic may mean data. For example, the first selection circuit 215 may be implemented as a multiplexer.

For example, when the selection code SEL is the same as a reference selection code MTS, the first selection circuit 215 outputs a main temperature signal MO1 (MO1=MTSS) to the second selection circuit 225. However, when the selection code SEL is different from the reference selection code MTS, the first selection circuit 215 outputs any one temperature signal MO1 among the temperature signals TSS1, TSS2, TSS3, and TSS4 to the selection circuit 225.

The reference voltage generator 220 generates a reference voltage (or the reference voltage signal VREF) independent of a change in temperature.

The second selection circuit 225 outputs at least one of the reference voltage VREF input to a first input terminal M21 and the output signal MO1 of the first selection circuit 215 input to a second input terminal M22 to the converter 230 in response to a first control signal CTL1 output from the control circuit 250 and a second control signal CTL2 output from the arithmetic circuit 245.

The first control signal CTL1 is a control signal indicating whether a voltage conversion condition is satisfied, and the second control signal CTL2 is a control signal for controlling an output operation of the second selection circuit 225. In FIG. 3, for convenience of description, it is illustrated that the second selection circuit 225 performs an output operation when the second control signal CTL2 is at a high level (H), but the present disclosure is not limited thereto.

According to an embodiment, the second selection circuit 225 may output (e.g., as MO2) the reference voltage VREF to the converter 230 and then may output (e.g., as MO2) the output signal MO1 of the first selection circuit 215 to the converter 230, in response to the first control signal CTL1 indicating that the voltage conversion condition is satisfied and the second control signal CTL2 being activated. For example, when the voltage conversion condition is satisfied, the first control signal CTL1 is activated.

According to example embodiments, the second selection circuit 225 may output (e.g., as MO2) the output signal MO1 of the first selection circuit 215 to the converter 230 and then may output (e.g., as MO2) the reference voltage VREF to the converter 230, in response to the first control signal CTL1 indicating that the voltage conversion condition is satisfied and the activated second control signal CTL2.

However, the second selection circuit 225 outputs (e.g., as MO2) only the output signal MO1 of the first selection circuit 215 to the converter 230 in response to the first control signal CTL1 indicating that the voltage conversion condition is not satisfied and the activated second control signal CTL2. For example, when the voltage conversion condition is not satisfied, the first control signal CTL1 is deactivated.

According to embodiments, the second selection circuit 225 may alternatively output (e.g., as MO2) the reference voltage VREF and the output signal MO1 of the first selection circuit 215 to the converter 230 with a time difference or may output (e.g., as MO2) only the output signal MO1 of the first selection circuit 215 to the converter 230, depending on whether the first control signal CTL1 is activated.

The converter 230, in response to the first control signal CTL1 indicating that the voltage conversion condition is satisfied, converts the output signal MO1 of the first selection circuit 215, that is, the temperature signal TSS1, TSS2, TSS3, TSS4, or MTSS into a digital code representing temperature (this is called a 'temperature digital code TCO-DEi') and then converts the reference voltage VREF into a voltage digital code VCODEj (where 'j' is a natural number). According to an embodiment, the converter 230 may generate the temperature digital code TCODEi after generating the voltage digital code VCODEj.

However, the converter 230, in response to the first control signal CTL1 indicating that the voltage conversion condition is not satisfied, does not perform the operation of converting the reference voltage VREF into the voltage digital code VCODEj and performs only the operation of converting the output signal MO1 of the first selection circuit 215, that is, the temperature signal TSS1, TSS2, TSS3, TSS4, or MTSS into the temperature digital code TCODEi.

For example, the converter 230 periodically performs an operation of converting a temperature signal TSS1, TSS2, TSS3, TSS4, or MTSS into the temperature digital code TCODEi, but does not periodically perform an operation of converting the reference voltage VREF into the voltage digital code VCODEj. That is, the converter 230 performs the operation of converting the reference voltage VREF into the voltage digital code VCODEj only when the first control signal CTL1 indicates that the voltage conversion condition is satisfied.

According to an embodiment, the converter 230 may be a time-to-digital converter (TDC) or a time digitizer. For example, the TDC or the time digitizer is a device that converts time information into a digital code and generates a digital code corresponding to a time difference between two input signals.

The reason for converting the temperature signal TSS1, TSS2, TSS3, TSS4, or MTSS and the reference voltage VREF into the temperature digital code TCODEi and the voltage digital code VCODEj, respectively, is to improve accuracy by canceling an effect of an error term of an error (e.g., an error caused by an operating clock signal supplied to the TDC 230) associated with the temperature signal TSS1, TSS2, TSS3, TSS4 or MTSS and the reference voltage VREF.

Since the temperature sensor 200A according to the present disclosure generates the output temperature code OUTi using only one TDC 230, its area is lesser than that of a conventional temperature sensor that generates an output temperature code using two TDCs.

In addition, the temperature sensor 200A according to the present disclosure generates the voltage digital code VCODEj corresponding to the reference voltage VREF at each output time only when the voltage conversion condition described in this specification is satisfied. Accordingly, when the voltage conversion condition is not satisfied, the temperature sensor 200A does not perform the conversion process of converting the reference voltage VREF to the voltage digital code VCODEj even at the output time, so the time required for the conversion process and the time required for generating the output temperature code OUTi are decreased.

In detail, since the temperature sensor 200A may omit a time-consuming conversion process (e.g., a conversion process of converting the reference voltage VREF into the voltage digital code VCODEj) of the converter 230, the time of generating the output temperature code OUTi is relatively fast.

A second output terminal OT2 of the converter 230 for outputting the voltage digital code VCODEj is connected to the input terminal of the memory device 235 and a third input terminal M31 of the third selection circuit 240.

The memory device 235 stores a previous voltage digital code PVCODE, a reference count RNUM, a reference count value RCNT, and the reference selection code MTS. The memory device 235 may be implemented with registers.

When the voltage digital code VCODEj is generated by the converter 230, the previous voltage digital code PVCODE is updated with the new voltage digital code VCODEj. For example, initially, each value of the digital signals included in the previous voltage digital code PVCODE may be logic 0.

The reference count RNUM may be a number related to an update period of the previous voltage digital code PVCODE. The reference count value RCNT may represent a value indicating that the temperature sensor 200A is operating for the first time (or a value indicating that the voltage digital code VCODEj has never been generated before), and the reference count value RCNT may be decimal 0 (zero). The reference selection code MTS may be a code indicating the output of the main temperature signal MTSS output from the main temperature probe 210.

The third selection circuit 240, in response to the first control signal CTL1 input to a selection terminal 240s, outputs (e.g., as MO3) the voltage digital code VCODEj input to the third input terminal M31 connected to the second output terminal OT2 of the converter 230 or the previous voltage digital code PVCODE input to a fourth input terminal M32 to the arithmetic circuit 245. For example, the third selection circuit 240 may be implemented with a multiplexer.

For example, the third selection circuit 240, in response to the first control signal CTL1 indicating that the voltage conversion condition is satisfied, outputs the voltage digital code VCODEj output from the second output terminal OT2 of the converter 230 to the arithmetic circuit 245. However, in response to the first control signal CTL1 indicating that the voltage conversion condition is not satisfied, the third selection circuit 240 outputs the previous voltage digital code PVCODE output from the memory device 235 to the arithmetic circuit 245.

The arithmetic circuit 245 uses the temperature digital code TCODEi output from the first output terminal OT1 of the converter 230 and an output code MO3 output from the third selection circuit 240 to generate the output temperature code OUTi.

According to an embodiment, the arithmetic circuit 245 may generate the output temperature code OUTi using Equation 1.

$$OUTi = \frac{(k1 * MO3 - TCODEi)}{MO3} * k2 - \text{Off} \qquad \text{[Equation 1]}$$

Here, k1 may be a constant, k2 may be a coefficient, Off may be an offset, and k1, k2, and Off may be real numbers.

The arithmetic circuit 245 generates an indication signal NI indicating that the output temperature code OUTi is output (or generated) whenever the new output temperature code OUTi is output (or generated) and outputs the indication signal NI to the counter 251 of the control circuit 250. According to an embodiment, after the output temperature code OUTi is output, the arithmetic circuit 245 may generate the second control signal CTL2 for controlling the operation of the second selection circuit 225 and may output the second control signal CTL2 to the second selection circuit 230.

The control circuit 250 includes a counter 251, a first comparator 255a, a second comparator 260, a third comparator 265, and an OR gate 270. According to embodiments, the control circuit 250 may include the counter 251 and the first comparator 255a, the counter 251 and the second comparator 260, or the third comparator 265. According to embodiments, when the control circuit 250 includes at least two of the first comparator 255a, the second comparator 260, and the third comparator 265, the control circuit 250 may include the OR gate 270.

The counter 251 counts the number of times the indication signal NI is received whenever the indication signal NI is output from the arithmetic circuit 245 and generates a count value CNT corresponding to the count result.

The first comparator 255a compares the count value CNT with the reference count value RCNT, outputs a first comparison signal COS1 indicating that the voltage conversion condition is satisfied when the count value CNT is equal to the reference count value RCNT, and outputs the first comparison signal COS1 indicating that the voltage conversion condition is not satisfied when the count value CNT is different from the reference count value RCNT.

When the voltage conversion condition is satisfied, the corresponding signal COS1, COS2, COS3, or CTL1 is activated, and when the voltage conversion condition is not satisfied, the corresponding signal COS1, COS2, COS3, or CTL1 is deactivated.

In this specification, activation means a transition from a low level to a high level or a high level state and deactivation means a transition from a high level to a low level or a low level state.

The second comparator 260 compares the count value CNT with the reference count RNUM, outputs the second comparison signal COS2 indicating that the voltage conversion condition is satisfied when the count value CNT is equal to the reference count RNUM, and outputs the second comparison signal COS2 indicating that the voltage conversion condition is not satisfied when the count value CNT is different from the reference count RNUM.

According to an embodiment, after the second comparison signal COS2 indicating that the voltage conversion condition is satisfied is generated, the counter 251 may be initialized in response to the second comparison signal COS2 indicating that the voltage conversion condition is satisfied.

The third comparator 265 compares the selection code SEL with the reference selection code MTS, outputs the third comparison signal COS3 indicating that the voltage conversion condition is satisfied when the selection code SEL is the same as the reference selection code MTS, and outputs the third comparison signal COS3 indicating that the voltage conversion condition is not satisfied when the selection code SEL is different from the reference selection code MTS. The reference selection code MTS may be digital signals for transmitting the main temperature signal MTSS output from the main temperature probe 210 to the second selection circuit 225.

The OR gate 270 performs OR gating with respect to the first comparison signal COS1, the second comparison signal COS2, and the third comparison signal COS3 to generate the first control signal CTL1 corresponding to the result.

Figure 4:
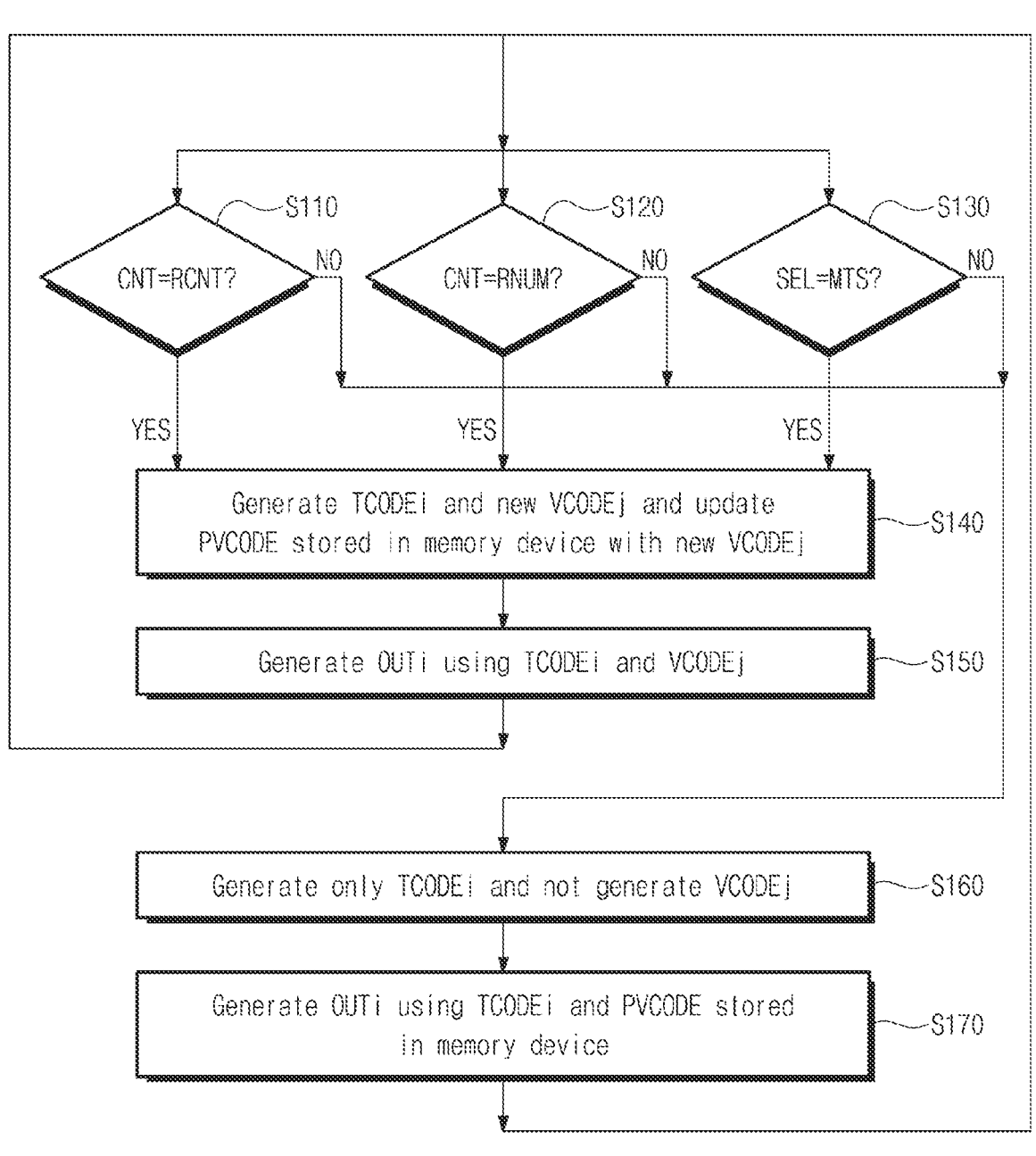
FIG. 4 is a flowchart for describing an operation of a temperature sensor illustrated in FIG. 2.

FIG. 4 is a flowchart for describing an operation of a temperature sensor illustrated in FIG. 2.

Referring to FIGS. 2 to 4, according to embodiments, the control circuit 250 determines whether a first voltage conversion condition among a plurality of voltage conversion conditions is satisfied using the first comparator 255a (S110).

It is assumed that the second control signal CTL2 is activated, the reference count value RCNT is decimal 0 (zero), the count value CNT is decimal 0 at the beginning of operation of the temperature sensor 200A, and the selection code SEL is different from the reference selection code MTS.

When the count value CNT is equal to the reference count value RCNT (YES in S110), the first comparator 255a outputs the first comparison signal COS1 indicating that the first voltage conversion condition is satisfied, so the control circuit 250, for example, the OR gate 270 outputs the first control signal CTL1 indicating that the voltage conversion condition is satisfied.

The second selection circuit 225, in response to the first control signal CTL1 indicating that the voltage conversion condition is satisfied, outputs the reference voltage VREF and the output signal TSS1, TSS2, TSS3, or TSS4 of the first selection circuit 215 to the converter 230.

The converter 230 converts the output signal TSS1, TSS2, TSS3, or TSS4 of the first selection circuit 215 into the temperature digital code TCODE1 and converts the reference voltage VREF into a new voltage digital code VCODE1, and the previous voltage digital code PVCODE stored in the memory device 235 is updated with the new voltage digital code VCODE1 (S140).

The arithmetic circuit 245 generates the output temperature code OUT1 using the temperature digital code TCODE1 output from the converter 230 and the new voltage digital code VCODE1 output from the converter 230 (S150).

Because the output temperature code OUT1 is output, the arithmetic circuit 245 outputs the indication signal NI and the count value CNT of the counter 251 becomes decimal 1 upon reception of the indication signal NI.

As the count value CNT increases from 0 to 1, the count value CNT (CNT=1) differs from the reference count value RCNT (RCNT=0). When the count value CNT (CNT=1) is different from the reference count value RCNT (RCNT=0) (NO in S110), since the first comparator 255a outputs the first comparison signal COS1 indicating that the first voltage conversion condition is not satisfied, the control circuit 250 outputs the first control signal CTL1 indicating that the voltage conversion condition is not satisfied.

The second selection circuit 225 outputs only the output signal TSS1, TSS2, TSS3, or TSS4 of the first selection circuit 215 to the converter 230 in response to the first control signal CTL1 indicating that the voltage conversion condition is not satisfied. Since the converter 230 converts only the output signal TSS1, TSS2, TSS3, or TSS4 of the first selection circuit 215 into a temperature digital code TCODE2, the previous voltage digital code PVCODE (PVCODE=VCODE1) is maintained as it is (S160).

Since the third selection circuit 240 outputs the previous voltage digital code PVCODE (PVCODE=VCODE1) stored in the memory device 235 to the arithmetic circuit 245 in response to the first control signal CTL1 indicating that the voltage conversion condition is not satisfied, the arithmetic circuit 245 uses the temperature digital code TCODE2 output from the converter 230 and the previous voltage digital code PVCODE (PVCODE=VCODE1) output from the memory device 235 to generate the output temperature code OUT2 (S170).

The arithmetic circuit 245 may generate each output temperature code OUT1 and OUT2 using Equation 1 (S150 and S170).

Referring to FIGS. 2 to 4, according to embodiments, the control circuit 250 determines whether a second voltage conversion condition among a plurality of voltage conversion conditions is satisfied using the second comparator 260 (S120).

It is assumed that the second control signal CTL2 is activated, the reference count RNUM is decimal 10, the count value CNT is decimal 10, and the selection code SEL is different from the reference selection code MTS.

For example, until the count value CNT becomes decimal 10, since the first comparator 255a of the temperature sensor 200A outputs the first comparison signal COS1 indicating that the first voltage conversion condition is not satisfied, the control circuit 250 outputs the first control signal CTL1 indicating that the first voltage conversion condition is not satisfied. Accordingly, the temperature sensor 200A performs operations (NO of S110, S160, and S170).

When the count value CNT (CNT=10) is equal to the reference count RNUM (RNUM=10) (YES in S120), since the second comparator 260 outputs the second comparison signal COS2 indicating that the second voltage conversion condition is satisfied, the control circuit 250 outputs the first control signal CTL1 indicating that the voltage conversion condition is satisfied.

The second selection circuit 225, in response to the first control signal CTL1 indicating that the voltage conversion condition is satisfied, outputs the reference voltage VREF and the output signal TSS1, TSS2, TSS3, or TSS4 of the first selection circuit 215 to the converter 230 at different times.

The converter 230 converts the reference voltage VREF into a new voltage digital code VCODE2 and converts the output signal TSS1, TSS2, TSS3, or TSS4 of the first selection circuit 215 to a temperature digital code TCODE11, and the previous voltage digital code PVCODE (PVCODE=VCODE1) stored in the memory device 235 is updated with the new voltage digital code VCODE2 (S140).

Since the third selection circuit 240 outputs the new voltage digital code VCODE2 to the arithmetic circuit 245 in response to the first control signal CTL1 indicating that the voltage conversion condition is satisfied, the arithmetic circuit 245 uses the temperature digital code TCODE11 output from the converter 230 and the new voltage digital code VCODE2 output from the converter 230 to generate an output temperature code OUT11 (S150).

As the output temperature code OUT11 is output, the arithmetic circuit 245 outputs the indication signal NI and the count value CNT is incremented to decimal 11 in response to the counter 251 receiving the indication signal NI.

When the count value CNT (CNT=11) is different from the reference count RNUM (RNUM=10) (NO in S120), since the second comparator 260 outputs the second comparison signal COS2 indicating that the second voltage conversion condition is not satisfied, the control circuit 250 outputs the first control signal CTL1 indicating that the voltage conversion condition is not satisfied.

The second selection circuit 225 outputs only the output signal TSS1, TSS2, TSS3, or TSS4 of the first selection circuit 215 to the converter 230 in response to the first control signal CTL1 indicating that the voltage conversion condition is not satisfied.

Since the converter 230 converts only the output signal TSS1, TSS2, TSS3, or TSS4 of the first selection circuit 215 into the temperature digital code TCODE11, the previous voltage digital code PVCODE (PVCODE=VCODE2) is maintained as it is (S160).

The arithmetic circuit 245 generates the output temperature code OUT12 using the temperature digital code TCODE11 output from the converter 230 and the previous voltage digital code PVCODE (PVCODE=VCODE2) output from the memory device 235 (S170).

As the output temperature code OUT12 is output, the arithmetic circuit 245 outputs the indication signal NI, such that the count value CNT is incremented to decimal 12 in response to the counter 251 receiving the indication signal NI.

Referring to FIGS. 2 to 4, according to embodiments, the control circuit 250 determines whether a third voltage conversion condition among a plurality of voltage conversion conditions is satisfied using the third comparator 265 (S130).

It is assumed that the second control signal CTL2 is activated, the count value CNT is decimal 12, and the selection code SEL is equal to the reference selection code MTS.

When the selection code SEL is equal to the reference selection code MTS (YES in S130), since the third comparator 265 outputs the third comparison signal COS3 indicating that the third voltage conversion condition is satisfied, the control circuit 250 outputs the first control signal CTL1 indicating that the voltage conversion condition is satisfied.

The second selection circuit 225, in response to the first control signal CTL1 indicating that the voltage conversion condition is satisfied, outputs the reference voltage VREF and the output signal MTSS of the first selection circuit 215 to the converter 230.

In response to the first control signal CTL1 indicating that the voltage conversion condition is satisfied, the converter 230 converts the reference voltage VREF into a new voltage digital code VCODE3, converts the output signal MTSS of the first selection circuit 215 into a temperature digital code TCODE13, and the previous voltage digital code PVCODE (PVCODE=VCODE2) stored in the memory device 235 is updated with the new voltage digital code VCODE3 (S140).

The arithmetic circuit 245 generates the output temperature code OUT13 using the temperature digital code TCODE13 output from the converter 230 and the new voltage digital code VCODE3 output from the converter 230 (S150).

As the output temperature code OUT13 is output, the arithmetic circuit 245 outputs the indication signal NI, such that the count value CNT is incremented to decimal 13 in response to the counter 251 receiving the indication signal NI.

After that, assuming that the selection code SEL is different from the reference selection code MTS, when the selection code SEL is different from the reference selection code MTS (NO in S130), since the third comparator 265 outputs the third comparison signal COS3 indicating that the third voltage conversion condition is not satisfied, the control circuit 250 outputs the first control signal CTL1 indicating that the voltage conversion condition is not satisfied.

The second selection circuit 225 outputs only the output signal TSS1, TSS2, TSS3, or TSS4 of the first selection circuit 215 to the converter 230 in response to the first control signal CTL1 indicating that the voltage conversion condition is not satisfied.

In response to the first control signal CTL1 indicating that the voltage conversion condition is not satisfied, since the converter 230 converts only the output signal TSS1, TSS2, TSS3, or TSS4 of the first selection circuit 215 into a temperature digital code TCODE14, the previous voltage digital code PVCODE (PVCODE=VCODE3) stored in the memory device 235 is maintained as it is (S160).

The arithmetic circuit 245 generates the output temperature code OUT14 using the temperature digital code TCODE14 output from the converter 230 and the previous voltage digital code PVCODE (PVCODE=VCODE3) output from the memory device 235 (S170).

As the output temperature code OUT14 is output, the arithmetic circuit 245 outputs the indication signal NI, such that the count value CNT is incremented to decimal 14 in response to the counter 251 receiving the indication signal NI.

FIG. 5 is a block diagram of another embodiment of a temperature sensor illustrated in FIG. 1.

Referring to FIG. 5, a temperature sensor 200B corresponding to another embodiment of the temperature sensor 200 of FIG. 1 includes the main temperature probe 210, the first selection circuit 215, the reference voltage generator 220, the second selection circuit 225, the converter 230, the memory device 235, the third selection circuit 240, the arithmetic circuit 245, and the control circuit 250.

When comparing the memory device 235 of FIG. 1 with the memory device 235 of FIG. 5, a reference code RCODE is stored in the memory device 235 of FIG. 5 instead of the reference count value RCNT.

In addition, when comparing the control device 250 of FIG. 1 with the control device 250 of FIG. 5, the first comparator 255b of the control device 250 of FIG. 5 compares the previous voltage digital code PVCODE with the reference code RCODE.

Figure 6:
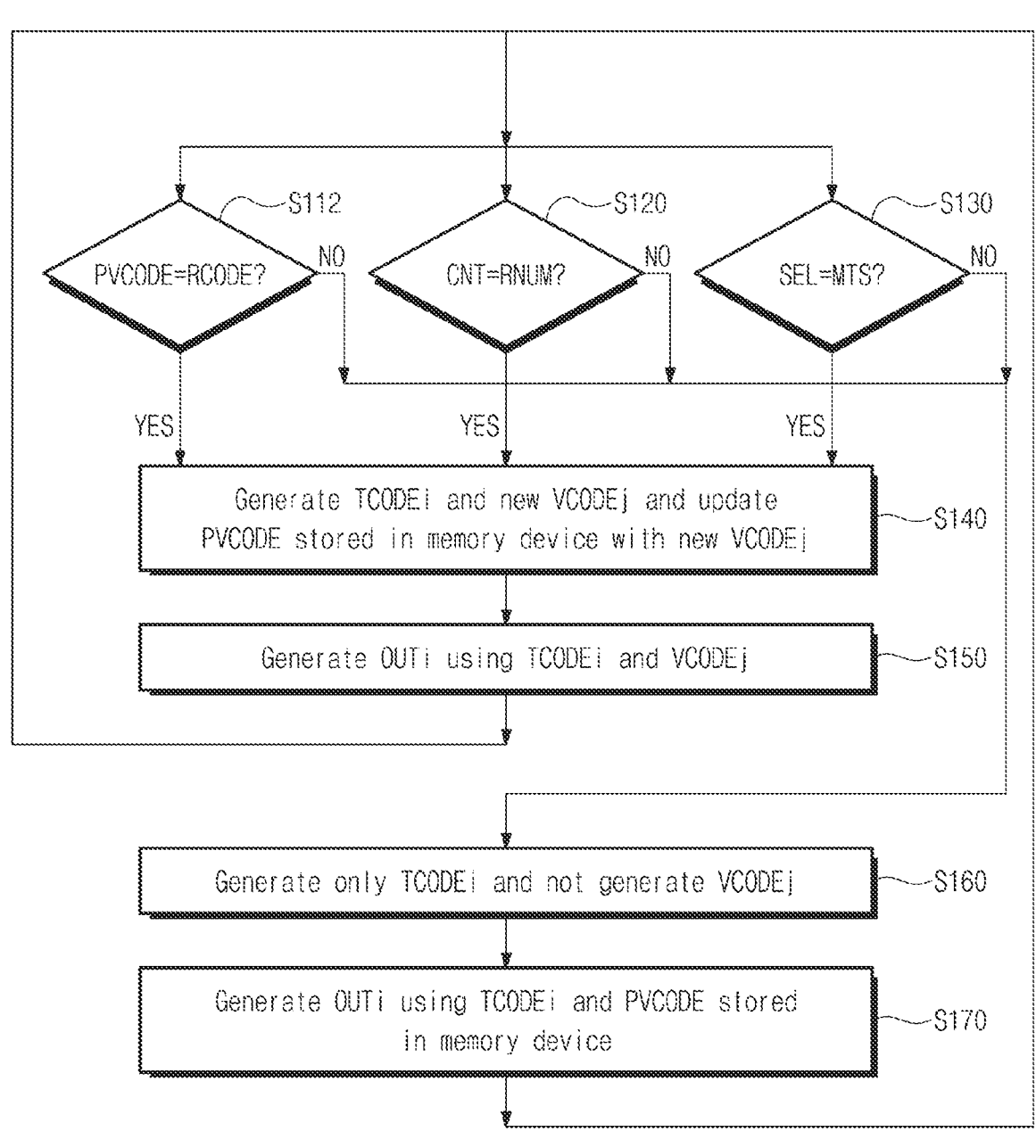
FIG. 6 is a flowchart for describing an operation of a temperature sensor illustrated in FIG. 5.

FIG. 6 is a flowchart for describing an operation of a temperature sensor illustrated in FIG. 5. Referring to FIGS. 4 to 6, according to embodiments, the control circuit 250 determines whether the first voltage conversion condition among a plurality of voltage conversion conditions is satisfied using the first comparator 255b (S112).

It is assumed that the second control signal CTL2 is activated, each of the previous voltage digital code PVCODE and the reference code RCODE stored initially (or by default) in the memory device 235 is 000000000 (in 9-bit format), the digital code VCODE1 is different from the reference code RCODE, and the selection code SEL is different from the reference selection code MTS.

When the previous voltage digital code PVCODE is the same as the reference code RCODE (YES in S112), since the first comparator 255b outputs the first comparison signal COS1 indicating that the first voltage conversion condition is satisfied, the control circuit 250, for example, the OR gate 270 outputs the first control signal CTL1 indicating that the voltage conversion condition is satisfied.

The second selection circuit 225, in response to the first control signal CTL1 indicating that the voltage conversion condition is satisfied, outputs the reference voltage VREF and the output signal TSS1, TSS2, TSS3, or TSS4 of the first selection circuit 215 to the converter 230.

In response to the first control signal CTL1 indicating that the voltage conversion condition is satisfied, the converter 230 converts the reference voltage VREF into the new voltage digital code VCODE1, converts the output signal TSS1, TSS2, TSS3, or TSS4 of the first selection circuit 215 into the temperature digital code TCODE1, and the previous voltage digital code PVCODE stored in the memory device 235 is updated with the new voltage digital code VCODE1 (S140).

The arithmetic circuit 245 generates the output temperature code OUT1 using the temperature digital code TCODE1 output from the converter 230 and the new voltage digital code VCODE1 output from the converter 230 (S150).

As the output temperature code OUT1 is output, the arithmetic circuit 245 outputs the indication signal NI and the count value CNT of the counter 251 is incremented to decimal 1 in response to receiving the indication signal NI.

As the previous voltage digital code PVCODE stored in the memory device 235 is updated with the new voltage digital code VCODE1, the previous voltage digital code PVCODE (PVCODE=VCODE1) becomes different from the reference code RCODE.

When the previous voltage digital code PVCODE is different from the reference code RCODE (NO in S112), since the first comparator 255b outputs the first comparison signal COS1 indicating that the first voltage conversion condition is not satisfied, the control circuit 250, for example, the OR gate 270 outputs the first control signal CTL1 indicating that the voltage conversion condition is not satisfied.

The second selection circuit 225 outputs only the output signal TSS1, TSS2, TSS3, or TSS4 of the first selection circuit 215 to the converter 230 in response to the first control signal CTL1 indicating that the voltage conversion condition is not satisfied.

In response to the first control signal CTL1 indicating that the voltage conversion condition is not satisfied, since the converter 230 converts only the output signal TSS1, TSS2, TSS3, or TSS4 of the first selection circuit 215 into the temperature digital code TCODE2, the previous voltage digital code PVCODE (PVCODE=VCODE1) stored in the memory device 235 is maintained as it is (S160).

The arithmetic circuit 245 generates the output temperature code OUT2 using the temperature digital code TCODE2 output from the converter 230 and the previous voltage digital code PVCODE (PVCODE=VCODE1) output from the memory device 235 (S170).

As the output temperature code OUT2 is output, the arithmetic circuit 245 outputs the indication signal NI and the count value CNT of the counter 251 is incremented to decimal 2 in response to receiving the indication signal NI.

Figure 7:
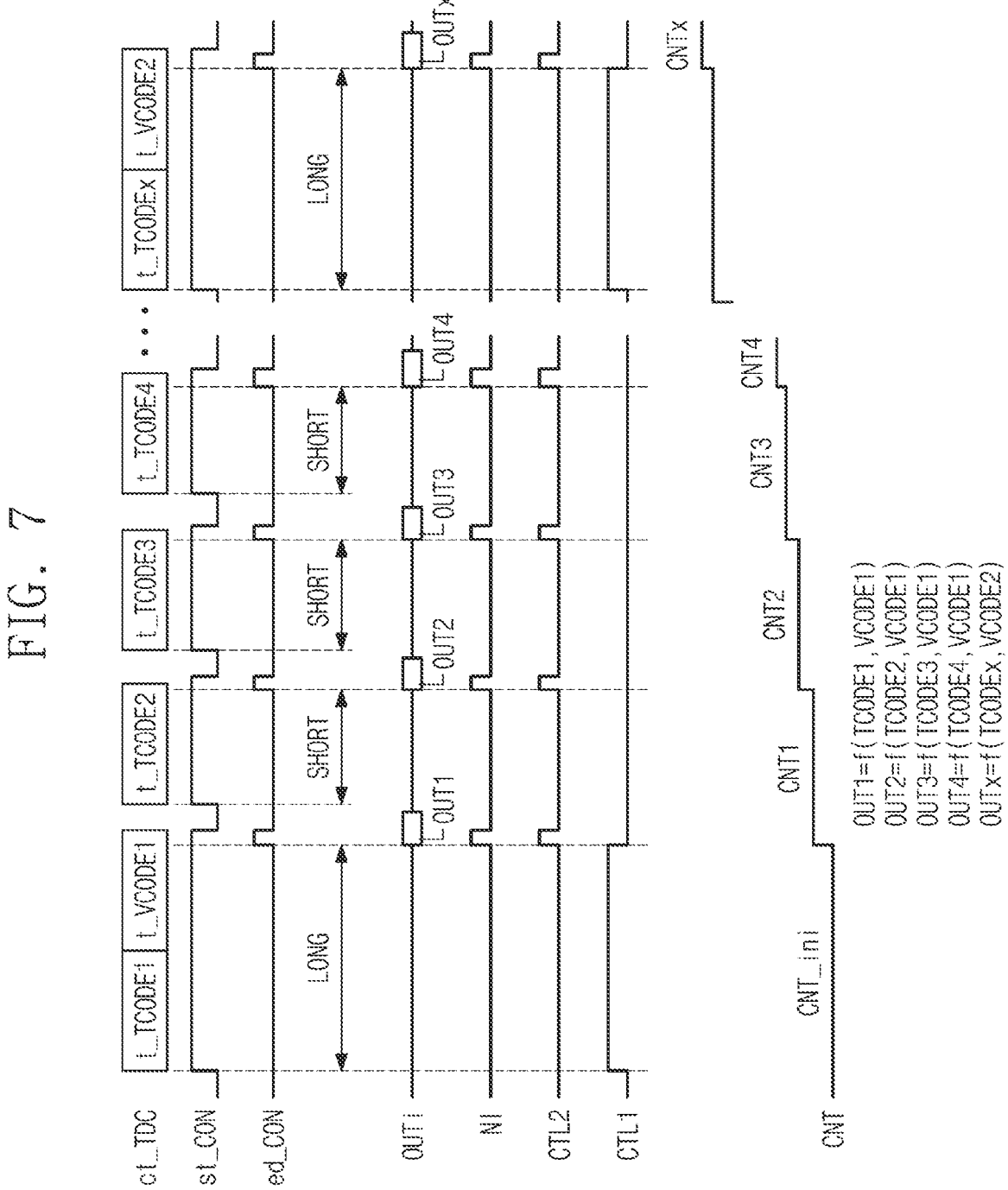
FIG. 7 is a timing diagram of signals for describing an operation of one time-to-digital converter and an operation of an arithmetic circuit included in a temperature sensor illustrated in FIG. 2 or FIG. 5.

FIG. 7 is a timing diagram illustrating an operation of a time-to-digital converter and an output signal of an arithmetic circuit included in the temperature sensor illustrated in FIG. 2 or 5. The timing diagram of FIG. 7 is provided as an example for convenience of description associated with the operation of the temperature sensors 200, 200A, and 200B, and thus is not limited thereto.

In FIG. 7, ct_TDC represents a conversion time of the converter 230, st_CON represents a conversion start signal input to the converter 230, ed_CON represents a conversion end signal input to the converter 230, t_TCODEx ($1 \leq x \leq i$) is a time required to convert the temperature signal TSS1, TSS2, TSS3, TSS4, or MTSS into the temperature digital code TCODEi, each of t_VCODE1 and t_VCODE2 represents a time required to convert the reference voltage VREF into the voltage digital code VCODEj (j=1 or 2), and CNT_ini represents the initial value of the counter 251.

When the first control signal CTL1 indicating that the voltage conversion condition is satisfied is generated, the converter 230 should convert the temperature signal TSS1, TSS2, TSS3, TSS4, or MTSS and the reference voltage VREF into the temperature digital code TCODE1 or TCO-DEx and the voltage digital code VCODE1 or VCODE2, respectively.

However, when the first control signal CTL1 indicating that the voltage conversion condition is not satisfied occurs, the converter 230 should convert only the temperature signal TSS1, TSS2, TSS3, TSS4, or MTSS into the temperature digital code TCODE2, TCODE3, or TCODE4.

Accordingly, a conversion time LONG of the converter 230 when the first control signal CTL1 indicates that the voltage conversion condition is satisfied is longer than a conversion time SHORT of the converter 230 when the first control signal CTL1 indicates that the voltage conversion condition is not satisfied.

That is, whenever the first control signal CTL1 indicates that the voltage conversion condition is not satisfied, the converter 230 may skip the operation (or process) of converting the reference voltage VREF into the voltage digital code VCODEj.

Therefore, an average conversion time of the temperature sensors 200, 200A, and 200B according to the present disclosure is significantly reduced compared to an average conversion time of a conventional temperature sensor that does not skip the operation (or process) of converting the reference voltage VREF into the voltage digital code VCODEj.

When the voltage conversion condition is satisfied (e.g., when the voltage digital code VCODE1 corresponding to the reference voltage VREF is generated), the arithmetic circuit 245 generates the output temperature code OUT1 using a function of the temperature digital code TCODE1 and the voltage digital code VCODE1.

When the voltage conversion condition is satisfied (e.g., when the voltage digital code VCODE2 corresponding to the reference voltage VREF is generated), the arithmetic circuit 245 generates the output temperature code OUTx using a function of the temperature digital code TCODEx and the voltage digital code VCODE2.

However, when the voltage conversion condition is not satisfied (e.g., when the voltage digital code VCODE1 corresponding to the reference voltage VREF is not generated), the arithmetic circuit 245 generates the output temperature code OUT2 using a function of the temperature digital code TCODE2 and the previous voltage digital code PVCODE (PVCODE=VCODE1), generates an output temperature code OUT3 using a function of the temperature digital code TCODE3 and the previous voltage digital code PVCODE (PVCODE=VCODE1), and generates an output temperature code OUT4 using a function of the temperature digital code TCODE4 and the previous voltage digital code PVCODE (PVCODE=VCODE1).

Figure 8:
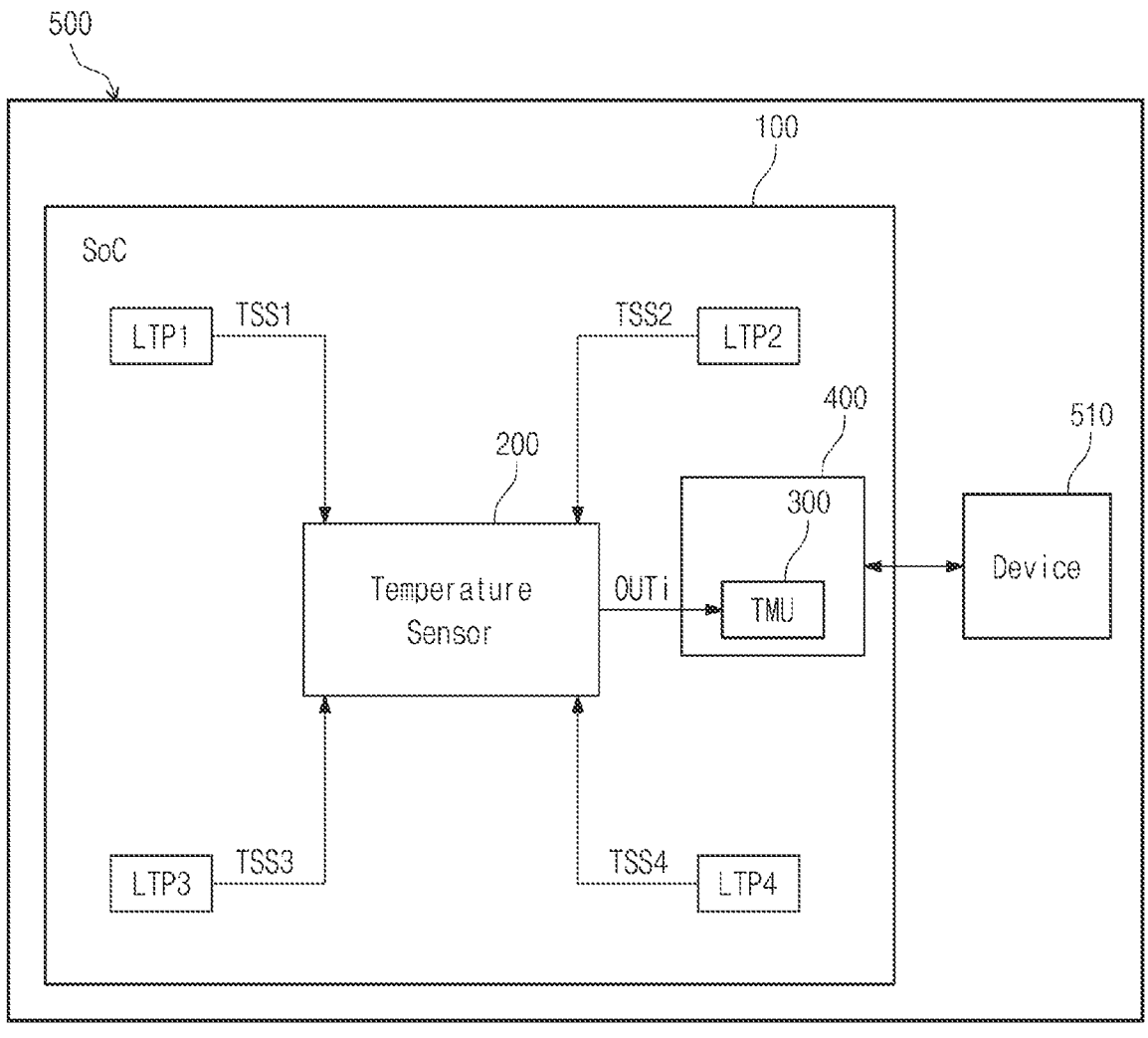
FIG. 8 is a block diagram of an electronic device including a system on chip illustrated in FIG. 1.

FIG. 8 is a block diagram of an electronic device including a system on chip illustrated in FIG. 1. Referring to FIGS. 1 to 8, an electronic device 500 includes the system on chip 100 and a device 510. The system on chip 100 includes a controller 400 including the TMU 300. The controller 400 may be a CPU, a GPU, or a processor.

When the electronic device 500 is a mobile device, the controller 400 may be an application processor (AP). The mobile device may be a smart phone, a laptop computer, a mobile internet device (MID), an internet of things (IoT) device, or a wearable computer.

The processor 400 may control the operation of the device 510, and the device 510 may be a memory device (e.g., a hard disk drive (HDD), a solid state drive (SSD), a universal flash storage (UFS) device, etc.) or a display device.

According to an embodiment of the present disclosure, since a temperature sensor includes only one time-to-digital converter, it is possible to reduce the arrangement area of the temperature sensor. In addition, since the one time-to-digital converter converts a reference voltage and a temperature signal into a voltage digital code and a temperature digital code, respectively, only when a voltage conversion condition is satisfied, and converts only the temperature signal into the temperature digital code using the one time-to-digital converter in other cases, it is possible to reduce the conversion time of the one time-to-digital converter.

According to an embodiment of the present disclosure, a temperature sensor that uses one time-to-digital converter to generate temperature information (or output temperature code) may convert the reference voltage and the temperature signal into the voltage digital code and the temperature digital code, respectively, only when the voltage conversion condition is satisfied, and may skip the process of converting the reference voltage into the voltage digital code in other cases. As the process of converting the reference voltage into the voltage digital code is skipped, the temperature sensor may quickly generate temperature information (or output temperature code).

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A temperature sensor comprising:
   a first selection circuit configured to output a selected temperature signal among temperature signals in response to a selection code;
   a reference voltage generator configured to generate a reference voltage;
   a control circuit configured to generate a control signal;
   a second selection circuit configured to:

output both the reference voltage and the selected temperature signal in response to the control signal indicating that a voltage conversion condition is satisfied, and output only the selected temperature signal in response to the control signal indicating that the voltage conversion condition is not satisfied; and a converter configured to:

convert the reference voltage to a voltage digital code and the selected temperature signal to a temperature digital code in response to the control signal indicating that the voltage conversion condition is satisfied, and convert only the selected temperature signal to the temperature digital code in response to the control signal indicating that the voltage conversion condition is not satisfied.

2. The temperature sensor of claim 1, further comprising:

a memory device configured to store a previous voltage digital code;

a third selection circuit configured to:

output the voltage digital code, received from the converter, in response to the control signal indicating that the voltage conversion condition is satisfied, and output the previous voltage digital code stored in the memory device in response to the control signal indicating that the voltage conversion condition is not satisfied; and an arithmetic circuit configured to generate an output temperature code using both the temperature digital code received from the converter and an output code received from the third selection circuit, wherein the output code is either the voltage digital code or the previous voltage digital code.

3. The temperature sensor of claim 2, wherein the control circuit is configured to:

determine whether the temperature sensor is initially activated, and generate the control signal indicating that the voltage conversion condition is satisfied in response to determining the temperature sensor is initially activated.

4. The temperature sensor of claim 2, wherein the control circuit is configured to:

determine an update period of the previous voltage digital code stored in the memory device based on the number of times an indication signal is received, the indication signal indicating that the output temperature code is output by the arithmetic circuit, and generate the control signal indicating that the voltage conversion condition is satisfied every update period.

5. The temperature sensor of claim 2, wherein the control circuit is configured to:

determine whether the selection code is a code indicating an output of a main temperature signal output by a main temperature probe, and generate the control signal indicating that the voltage conversion condition is satisfied in response to determining the selection code indicates the output of the main temperature signal.

6. The temperature sensor of claim 2, wherein in response to the voltage digital code being generated by the converter, the previous voltage digital code stored in the memory device is replaced by the voltage digital code.

7. A system on chip (SoC) comprising:

local temperature sensors configured to generate local temperature signals; and a temperature sensor connected to the local temperature sensors, wherein the temperature sensor includes:

a main temperature sensor configured to generate a main temperature signal, a first selection circuit configured to output both a selected temperature signal among the local temperature signals and the main temperature signal in response to a selection code, a reference voltage generator configured to generate a reference voltage, a control circuit configured to generate a control signal, a second selection circuit configured to:

output both the reference voltage and the selected temperature signal in response to the control signal indicating that a voltage conversion condition is satisfied; and output only the selected temperature signal in response to the control signal indicating that the voltage conversion condition is not satisfied, and a converter configured to:

convert both the reference voltage to a voltage digital code and the selected temperature signal to a temperature digital code in response to the control signal indicating that the voltage conversion condition is satisfied; and convert only the selected temperature signal to the temperature digital code in response to the control signal indicating that the voltage conversion condition is not satisfied.

8. The system on chip of claim 7, further comprising:

a memory device configured to store a previous voltage digital code;

a third selection circuit configured to:

output the voltage digital code, received from the converter, in response to the control signal indicating that the voltage conversion condition is satisfied, and output the previous voltage digital code, received from the memory device, in response to the control signal indicating that the voltage conversion condition is not satisfied; and an arithmetic circuit configured to generate an output temperature code using both the temperature digital code received from the converter and an output code received from the third selection circuit, wherein the output code is either the voltage digital code or the previous voltage digital code.

9. The system on chip of claim 8, wherein the control circuit is configured to:

determine whether the temperature sensor is initially activated, and generate the control signal indicating that the voltage conversion condition is satisfied in response to determining the temperature sensor is initially activated.

10. The system on chip of claim 8, wherein the control circuit includes:

a counter configured to:

receive an indication signal indicating that the output temperature code is output, and generate a count value of the number of times the indication signal is received; and a comparator configured to:

compare the count value with a reference value, and generate the control signal indicating that the voltage conversion condition is satisfied in response to the count value being equal to the reference value.

11. The system on chip of claim 8, wherein the control circuit is configured to:

determine an update period of the previous voltage digital code stored in the memory device based on the number of times an indication signal is received, the indication signal indicating that the output temperature code is output by the arithmetic circuit, and generate the control signal indicating that the voltage conversion condition is satisfied every update period.

12. The system on chip of claim 8, wherein the control circuit includes:

a counter configured to:

receive an indication signal indicating that the output temperature code is output, and generate a count value of the number of times the indication signal is received; and a comparator configured to:

compare the count value with a reference count, and generate the control signal indicating that the voltage conversion condition is satisfied in response to determining the count value is equal to the reference count, wherein the reference count indicates an update period of the previous voltage digital code stored in the memory device.

13. The system on chip of claim 8, wherein the control circuit is configured to:

determine whether the selection code is a code indicating an output of the main temperature signal by a main temperature sensor, and generate the control signal indicating that the voltage conversion condition is satisfied in response to determining the selection code indicates the output of the main temperature signal by the main temperature sensor.

14. The system on chip of claim 8, wherein:

the control circuit includes a comparator configured to:

compare a reference selection code with the selection code; and generate the control signal indicating that the voltage conversion condition is satisfied in response to the reference selection code being equal to the selection code, and the first selection circuit outputs the main temperature signal as the selected temperature signal in response to the selection code being identical to the reference selection code.

15. The system on chip of claim 8, wherein the control circuit includes a comparator configured to:

compare the previous voltage digital code with a reference code, and generate the control signal indicating that the voltage conversion condition is satisfied in response to the previous voltage digital code being equal to the reference code.

16. The system on chip of claim 8, wherein:

the converter is a time-to-digital converter, and in response to the voltage digital code being generated by the time-to-digital converter, the previous voltage digital code stored in the memory device is replaced by the voltage digital code.

17. A temperature sensor comprising:

a control circuit that generates a first control signal; and a converter that converts:

both a reference voltage to a voltage digital code and a temperature signal to a temperature digital code in response to the first control signal, and only the temperature signal to the temperature digital code in the absence of the first control signal.

18. The temperature sensor of claim 17, wherein the control circuit generates the first control signal in response to determining an initialization condition of the temperature sensor exists.

19. The temperature sensor of claim 17, wherein the control circuit generates the first control signal in response to determining an update period of the temperature sensor has expired.

20. The temperature sensor of claim 17, wherein the control circuit generates the first control signal in response to determining the temperature signal is acquired from a predetermined reference temperature probe rather than another temperature probe.

* * * * *